Jan. 30, 1923.
S. R. KING.
FILTERING MECHANISM.
FILED NOV. 26, 1920.
1,443,918.
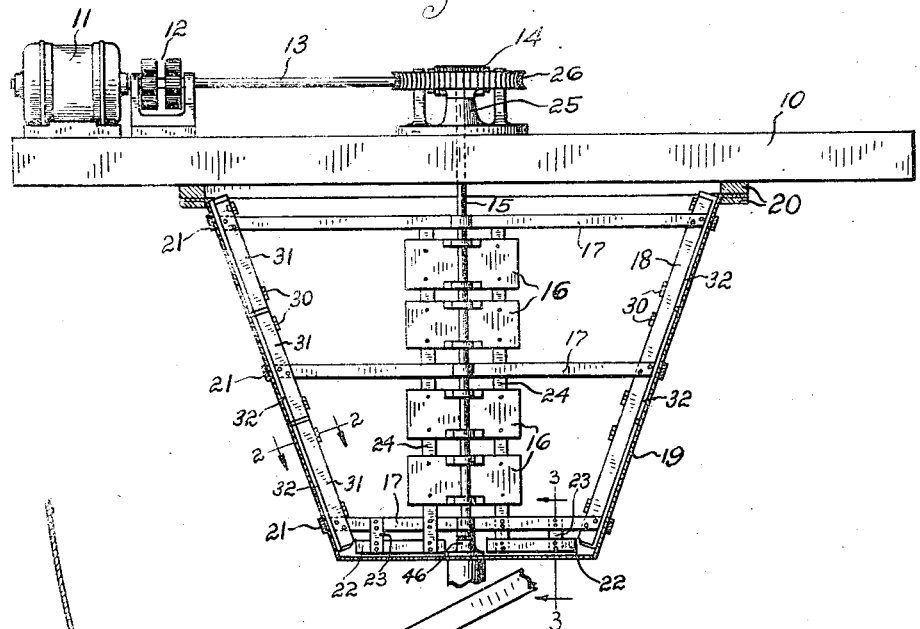
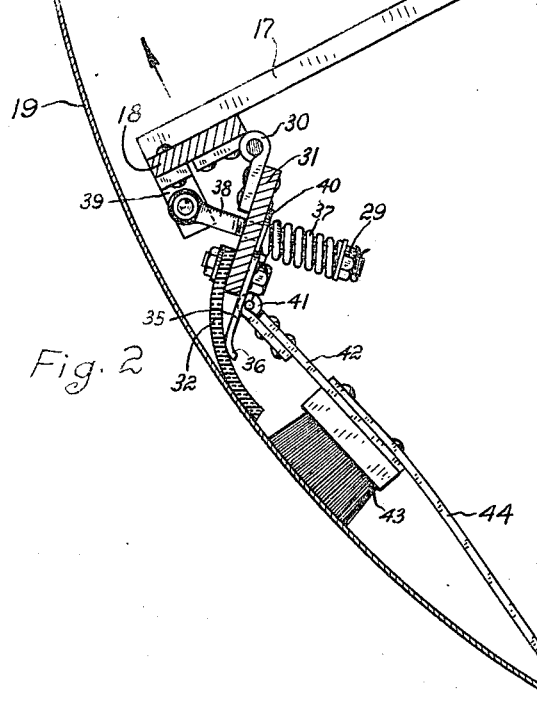
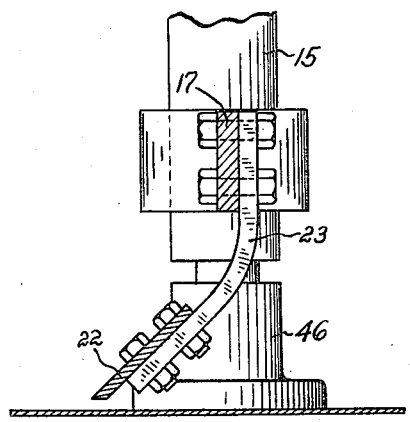
INVENTOR
Samuel R. King
BY
A. M. Wooster
ATTORNEY Patented Jan. 30, 1923.

1,443,918

UNITED STATES PATENT OFFICE.

SAMUEL R. KING, OF GLENBROOK, CONNECTICUT.

FILTERING MECHANISM.

Application filed November 26, 1920. Serial No. 426,452.

*To all whom it may concern:*

Be it known that I, SAMUEL R. KING, a citizen of the United States, residing at Glenbrook, county of Fairfield, State of Connecticut, have invented an Improvement in Filtering Mechanism, of which the following is a specification.

This invention relates to filtering devices adapted for general use in connection with liquids carrying insoluble matter in suspension, as in the manufacture of milk of magnesia. The object of the invention is to provide a device which will insure the effective performance of the filtering operation in very much less time than has heretofore been possible. In the process of filtering, the suspended matter, carried by the liquid as it passes through the filter, tends to form a deposit on the inner surface of the filter walls and thus clog the pores. The tendency of the suspended matter to settle under the influence of gravity is a further cause for the formation of such deposits. In order for the process of filtration to continue, it is necessary to remove such deposits as they accumulate.

It is also desirable to keep the contents of the filter in a continual state of agitation so as to prevent the solid particles from settling.

I have accomplished this purpose by employing a set of mechanically driven paddles to agitate the contents of the filter, and to the paddle blades are attached both wipers and brushes for contacting with the walls of the filter to remove the accumulation deposited thereon.

With these and other objects in view, I have devised the novel filtering device which I will now describe, referring to the accompanying drawings forming a part of this specification, wherein Figure 1 is a view showing my novel filtering device in elevation, the filter walls being shown in section, the brushes and springs being removed, Figure 2 is a section on an enlarged scale on the line 2—2 in Figure 1 looking in the direction of the arrows, and Figure 3 is a section on an enlarged scale on the line 3—3 in Figure 1, looking in the direction of the arrows.

The filter reservoir 19 is a receptacle having porous walls of any suitable material that will permit the percolation through it of the liquid to be filtered. In the preferred form of the invention a fabric such as canvas is employed for this purpose. The fineness of mesh of the fabric selected will depend upon the special use to which the device is to be applied. The reservoir may be of any ordinary or preferred form having a circular horizontal cross section. The reservoir is preferably of frusto-conical form, with the wide end open, and secured by the open end to a table 10 by circular clamping means 20. To retain the shape of the fabric walls, a plurality of horizontal hoops 21 are employed.

The means for agitating the contents of the reservoir consists of a stirring mechanism comprising a central vertical shaft 15, means for rotating the shaft, and a system of paddles secured to the shaft so as to rotate therewith. The shaft 15 is stepped in a pedestal bearing 46 secured to the bottom wall of the reservoir, and is journaled in a bearing 25 on the table 10. At its upper end the shaft 15 carries a worm wheel 26, driven by a worm 14 on a horizontal shaft 13, which is driven through suitable reduction gears 12, by a motor 11. The paddles consist of a set of outer blades 18, having their edges parallel to the inclined walls of the reservoir and slightly spaced therefrom, being held in this position and secured to the shaft 15 by a plurality of cross arms 17, a set of inner blades 16, secured by vertical tie members 24 to the cross arms 17, and a set of lower blades 22, secured by the tie pieces 24 and by other tie pieces 23 to the lowermost cross arm 17. The lower ends of the tie pieces 23 and 24 are preferably bent forward in the direction of rotation, as clearly shown in Figure 3, so as to give the lower blades an upward inclination, thus causing them to sweep the sediment which collects on the bottom of the reservoir upwardly.

For removing the deposit of sediment which accumulates upon the inclined walls of the reservoir a system of wipers and brushes are employed, as best illustrated in Figure 2. These members rotate with the blades 18, and are adapted to be held in yielding contact with the walls 19 from top to bottom. Secured to the rear or trailing surface of blade 18, at a plurality of points along its length, by means of hinge connections 30, is a plate 31, to which the wipers 32 are bolted or by other means suitably attached. The wipers 32 consist of strips of flexible material such as rubber or leather. They are caused to bear upon the walls 19 by springs 37, which are held by washers 40 between the plates 31 and adjusting nuts 29 on eyebolts 38 secured to angle members 39 fixed to blades 18. Thus by tightening up the nuts 29, the pressure of the wipers upon the inclined walls can be adjusted as desired. The wipers are reinforced by spring strips 35 secured to plates 31 and pressing upon the wipers from in back.

The brushes 43 are carried by plates 42, hinged to plates 31 as at 41. Each brush is provided with a tail piece 44, the rear end of which is curved and lies in engagement with the wall of the reservoir. As the stirring mechanism rotates centrifugal force will throw the tail piece outward and hold the brushes in close engagement with the walls of the reservoir, while the tail piece will prevent the brush bearing with excessive pressure. Tail pieces of different lengths and different degrees of flexibility may be used to regulate the bearing pressure of the brush, and it is possible by varying the length to compensate for wear of the bristles of the brush.

What I claim is:

1. In a filter comprising a receptacle having porous walls, means for agitating the contents of said receptacle and means carried by said first mentioned means for removing the accumulation of solid particles which are deposited upon said porous walls during filtration comprising a wiper and a brush trailing said wiper.

2. In a filter, comprising a receptacle having porous walls, paddles for agitating the contents of said receptacle, means for actuating said paddles, wipers and brushes carried by said paddles and held in yielding contact with said walls for removing the accumulation of solid particles which are deposited upon said porous walls during filtration.

3. In a filter comprising a receptacle having porous walls, means for agitating the contents of said receptacle and wipers and brushes carried by said agitating means and held in contact with said walls.

4. In a filter having walls in the form of a surface of revolution, a shaft rotatably mounted so as to be coaxial therewith, means for rotating the same, paddles spaced from and in proximity to said walls, other paddles situated in the central portion of the filter so as to leave a space intervening between them and the first mentioned paddles and means for fixing all said paddles to said shaft so as to rotate therewith.

5. In a filter having walls in the form of a surface of revolution, a shaft rotatably mounted in said filter so as to be coaxial therewith, means for rotating said shaft, a brush contacting with said walls for removing the accumulation of solid particles which are deposited thereupon during filtration, and means for securing said brush to said shaft so as to rotate therewith, said securing means including flexible connections for permitting said brush to bear outwardly against said walls under the influence of centrifugal force.

6. In a filter comprising a receptacle having porous walls, means for removing from said walls the accumulation of solid particles which are deposited thereupon during filtration, said means comprising brushes and wipers arranged so that one will trail the other, and means for driving said brushes and wipers.

7. In a filter, having a bottom wall, rotary stirring means comprising upwardly inclined blades spaced from and adjacent to said bottom wall to sweep upwardly the accumulation of solid particles which are deposited thereupon, and actuating means therefor.

8. In a filter having porous walls of circular cross section, brushes for said walls, means for rotating said brushes, means for securing said brushes to said rotating means and for permitting the former to bear outwardly against said walls under the influence of centrifugal force, and tail pieces secured to said brushes and adapted to bear against said walls to relieve said brushes of excessive bearing pressure.

9. A filtering device comprising a receptacle having porous walls, a hinged wiper plate, adjustable means for controlling the position of said plate with respect to said walls, a wiper carried by said plate for contacting with said walls, a brush flexibly carried by said wiper plate, means for holding said brush against said walls, and means on the brush for controlling the pressure of the same upon said walls.

10. In a filtering machine, a porous walled receptacle, a central shaft carrying a paddle receptacle, and a wiper, and a brush trailing the paddle.

11. In a filtering machine, a porous walled receptacle, a central shaft carrying a paddle, a wiper on the trailing side of the paddle, and a brush trailing the wiper.

12. In a filtering machine, a porous walled receptacle, a central shaft carrying a paddle, and a brush trailing the paddle and centrifugally pressed on the filter surface.

13. In a filtering machine, a porous walled receptacle, a central shaft carrying a paddle, a resiliently pressed wiper, and a centrifugally pressed brush.

14. In a filter, a porous walled receptacle, a rotating element, and a brush carried by said element and pressed against the walls of the receptacle by centrifugal action.

15. In a filter, a porous walled receptacle, a rotating element, a brush carried by said element and pressed against the walls of the receptacle by centrifugal action, and resilient means for controlling the pressure of said brush.

16. In a filter, a porous walled receptacle, a rotating element, a brush carried by said element and pressed against the walls of the receptacle by centrifugal action, and resilient means for controlling the pressure of said brush, comprising a spring plate secured to the brush and bearing against the walls of the receptacle.

In testimony whereof I affix my signature.

SAMUEL R. KING.